AUTOMATIC TELEPHONE MESSAGE SERVICE

Filed March 25, 1958 3 Sheets-Sheet 1

INVENTOR
R. R. RIESZ
BY Harry C. Hart
ATTORNEY

Aug. 29, 1961 R. R. RIESZ 2,998,489

AUTOMATIC TELEPHONE MESSAGE SERVICE

Filed March 25, 1958 3 Sheets-Sheet 2

INVENTOR
R. R. RIESZ
BY Harry C. Hart
ATTORNEY

INVENTOR
R. R. RIESZ
BY Harry C. Hart
ATTORNEY

United States Patent Office 2,998,489
Patented Aug. 29, 1961

2,998,489
AUTOMATIC TELEPHONE MESSAGE SERVICE

Robert R. Riesz, Chatham, N.J., assignor to Bell Telephone Laboratories, Incorporated, New York, N.Y., a corporation of New York Filed Mar. 25, 1958, Ser. No. 723,708
19 Claims. (Cl. 179—6)

Figures 1, 4:
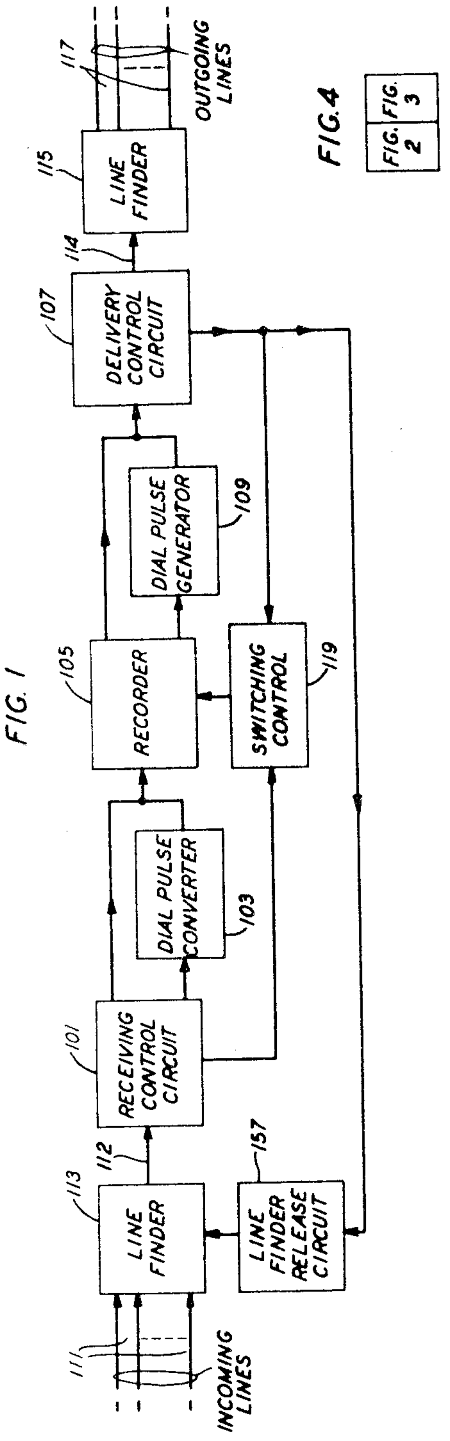

This invention relates to message delivery, and particularly to the delivery to a called party of a telephone message, originated by a calling party at a time when the called party is unable to receive it.

The economic basis for the enormous, and continually increasing, extent of the telephone network lies in the fact that ever increasing reliance is placed on telephone communications for the conduct of business and social affairs. In the natural course of events, the called party is sometimes out of reach of his telephone, or so occupied that he is unable immediately to accept an incoming call. For any such reason, he sometimes fails to answer when called. The greater the reliance placed on telephone communication for the conduct of affairs, the greater the annoyance, to the calling party at the moment and to the called party when he later learns what has transpired, arising out of the inability of the calling party to complete his call when he wishes to do so.

Furthermore, the ramification of the network and the increasing use of it made by calling parties operate independently and together to increase the chance that the telephone line of any particular called party will be found "busy" at the moment when some calling party seeks to reach him. The frequency of occurrence of one or other of these two situations has now reached such a state that it is a common experience to make five or six attempts before having success in completing a call.

A message recorder, located on the called party's premises and connected to his telephone line provides a partial solution to the problem presented by the first of these situations. Because such apparatus is for the most part idle, this solution is not an economical one. More important, the local recorder provides no solution to the problem presented by a busy condition of the called party's line.

It is the object of the present invention to enable the calling party to speak his message at his convenience, and to deliver the message to the called party as soon as he is ready and able to receive it.

The invention attains this object by the provision, at a central station, of recording apparatus for accepting from any calling party and in response to a particular called number, a voice message together with a coded designation of the called party's telephone number. Associated switching and control apparatus thereupon intermittently seeks access to the called party's telephone line, under control of the recorded telephone number. Upon obtaining such access and reaching the called party, the switching apparatus then couples the message record to the line, whereupon the message is repeated to the called party. Thus the convenience of both parties is best serverd, and the same central station apparatus is made available to the same extent to all subscribers.

Like any other central station apparatus the recording and message delivery facilities of the present invention are suitable for use by all the subscribers whose lines are connected to that central station: i.e., some hundreds or thousands. As a practical matter, therefore, in order that one such facility shall normally be available to any calling party requiring it, the central station will normally be provided with a number of such facilities, some for one class of service, others for other service classes, all the units of a class being accessible to all calling parties of that class, so that any calling party may be served unless in the exceptional case in which all the facilities are already in use. This central location of the facilities thus permits an optimum compromise, in design, between the allocation of a large number of such facilities to one station, which makes for freedom of access with increased cost, and a smaller number of such facilities, which makes for reduced cost with some restriction of access.

Figure 5A:
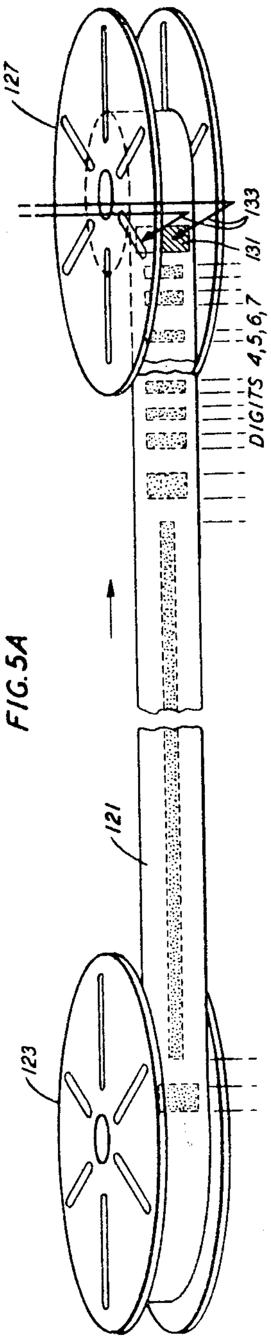
Figure 5B:
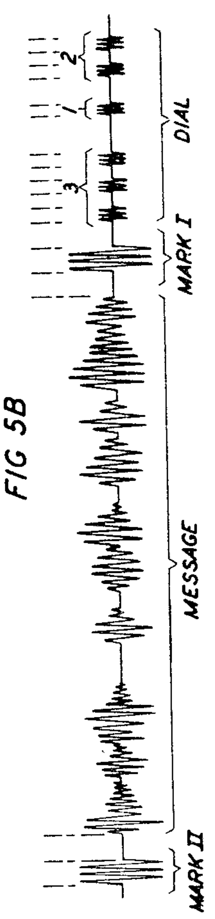
Figure 2:
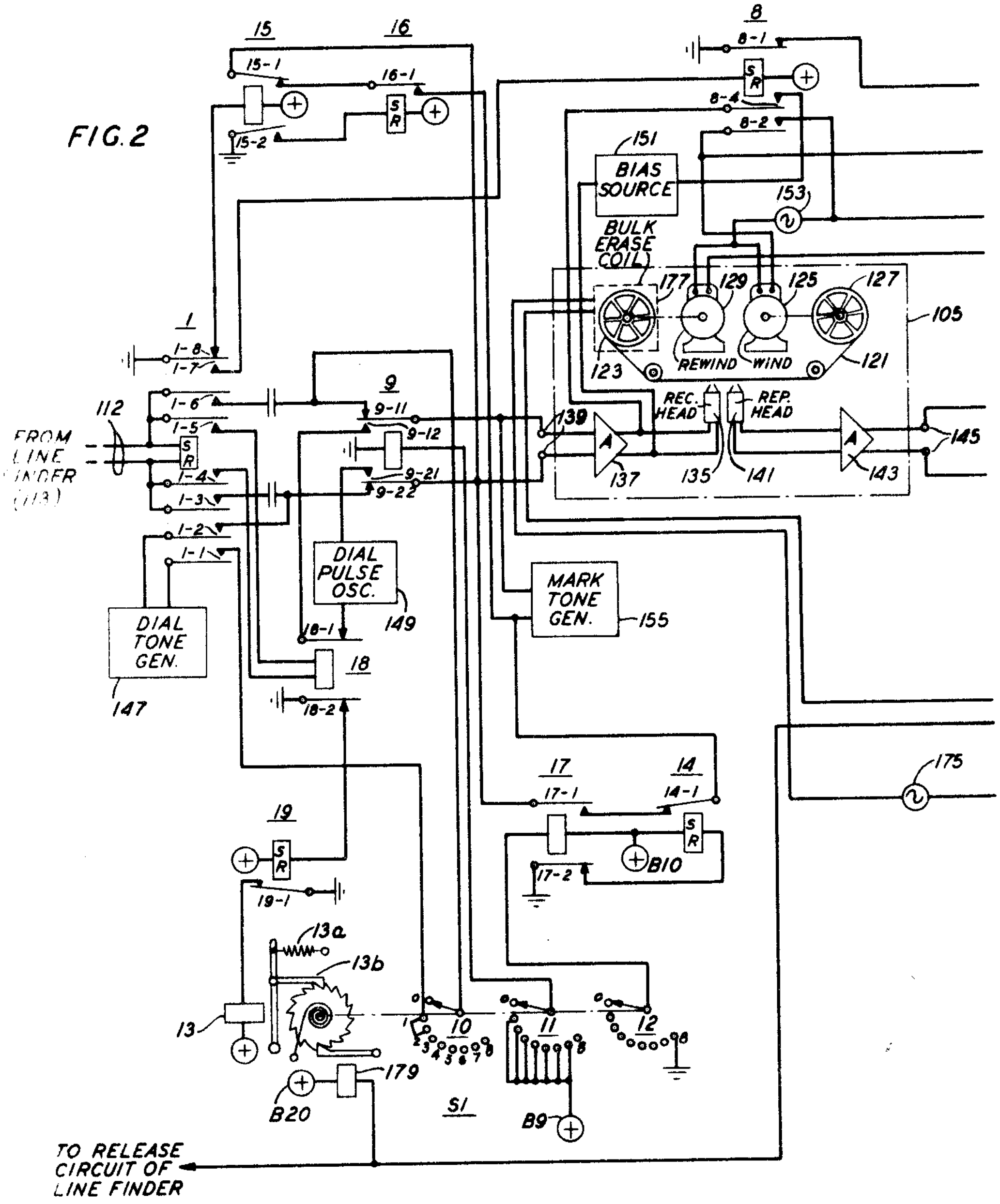
Figure 3:
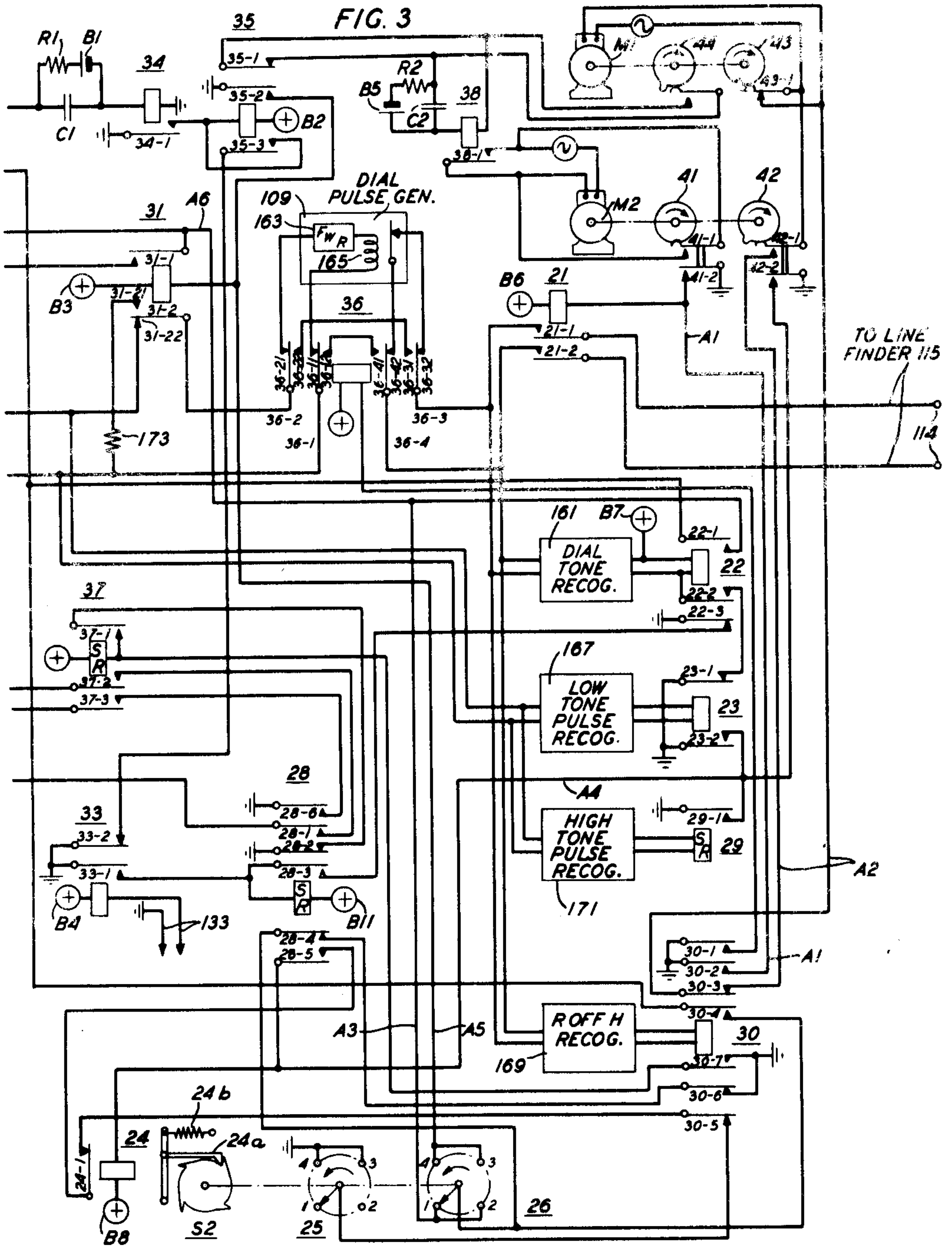

The invention, together with various other features not specifically mentioned above, will be readily apprehended from the following detailed description of a preferred embodiment thereof, taken in connection with the appended drawings in which:

FIG. 1 is a block schematic diagram showing the principal apparatus components with which the present invention is organized in a fashion to render it fully compatible with standard central station apparatus;

FIGS. 2 and 3, taken together in the order shown in FIG. 4, constitute a schematic circuit diagram illustrating the invention;

FIG. 5A is a perspective drawing showing a length of magnetizable tape bearing, at a preassigned point of its length, a strip of conductive material; and FIG. 5B is a waveform diagram showing portions of the various space waves that are recorded on the tape of FIG. 5A in the practice of the invention.

TMS SYSTEM AS CENTRAL STATION APPARATUS

Referring now to the drawings, FIG. 1 shows the Telephone Message Service (TMS) apparatus of the invention in block schematic form. Each set of apparatus, only one of which is shown, comprises a receiving control circuit 101 with its associated dial pulse converter 103, a recorder 105 and a delivery control circuit 107 with its associated dial pulse generator 109. To avoid the need for assigning one such set of apparatus to each calling party, access may be obtained by any one of a group of incoming lines 111 by way of a conventional line finder 113 to any unit of the set. Thus any caller requesting message delivery service may be routed by the central station apparatus to any idle message delivery facility of the group. The incoming conductors 111 shown entering the line finder 113 are those of the central station which follow the central station connector. Thus they are energized when and only when a calling party requests access to a message delivery unit.

The recorder 105 receives incoming information from the lines 111, through the line finder 113 and the control circuit 101 if the information is a message; if, to the contrary, it is signalling information, it passes additionally through the dial pulse converter 103. Similarly, the recorder 105 delivers signalling information through the dial pulse generator 109 and the delivery control circuit 107 to the input point 114 of an outgoing line finder 115, which makes connection with a specified one of the outgoing lines 117 and, once this connection has been made, the recorder 105 delivers its message information through the delivery control circuit 107 and the outgoing line finder 115 to the selected one of the outgoing lines 117.

The operations which the recorder carries out are determined by a switching control circuit 119, under control of signals that are derived in part from the receiving control circuit 101 and in part from the delivery control circuit 107.

The recorder 105 may in principle be of any desired construction. It is here illustrated as a magnetizable tape unit of the type which is now readily available on the open market, and lends itself well to the present use. As indicated in FIG. 2, it comprises a magnetizable tape 121 of a length sufficient to accommodate the longest contemplated message in addition to coded numerical designations as described below. The major part of the length of this tape is initially wound on a first or a "rewind" reel 123. For recording or playing back a recorded message the tape is advanced in a forward direction and at slow speed by a first motor 125 which drives a second or "wind" reel 127. Upon the completion of such operation the tape 121 may be restored to its initial position under control of a second motor 129 which drives the rewind reel 123 at a higher speed. As shown in FIG. 5A, the tape is provided near one end with a strip 131 of conducting material which operates, in conjunction with electrical probes 133 juxtaposed therewith, to determine the "start" position of the tape 121, by establishing a control circuit to initiate or terminate a desired operation, e.g., to terminate a rewind operation and initiate the next wind operation, when the tape, in the course of its return, has reached its "start" position.

The working portion of the tape 121, namely the free portion which has been unwound from the rewind reel 123 but not yet wound on the wind reel 127, is juxtaposed with a first magnetic recording head 135 to which incoming energy is supplied through an amplifier 137. The input terminals 139 of this amplifier thus constitute the input terminals of the recorder 105. The tape 121 is also juxtaposed with a second or reproduce head 141 from which the signals stored in the record are withdrawn for delivery, by way of another amplifier 143 to the output terminals 145 of the recorder 105, and thence, by way of switching and control apparatus 107 (FIG. 1), to be decsribed in detail below, to the input terminals 114 of the outgoing line finder 115.

Referring to a single TMS unit the operations are as follows:

When a customer wishes to send a TMS message he dials a special code number into his central office. A different code number will be associated with each of the different types of service of which the calling party wishes to avail himself. This means that a special code number is provided for each of the following services: local private line, local party line, long distance private line, long distance party line, and so forth. For convenience, the last four digits of each of these numbers may be the same for every central office: i.e., CR3–8367 (8367 being the designation of one of the TMS units located in the central station, designated by the code CR3, of the called party). Working through the line finder of FIG. 1 in the conventional fashion, the caller's "dialing" of the special code number associates the caller's own telephone instrument with an idle TMS unit, that is set up to furnish the particular service called for by the special code.

OUTLINE OF OPERATIONS OF TMS APPARATUS

To outline, first, the various operations of the apparatus from the points of view of the parties utilizing the service, if, when a customer has called for a particular TMS service all units assigned to that service are busy, the customer hears a busy signal (delivered to him in the fashion to be described). If one of the facilities is available, the customer hears a dial tone (delivered to him in a fashion likewise to be described). If he hears the busy signal he must hang up his instrument and wait. When he hears the dial tone he may "dial" his "destination" number i.e., that of the subscriber with whom he wishes to communicate. On the completion of his dialing operation he hears a distinctive tone. This informs the caller that the TMS unit is ready to receive a spoken message. The caller then speaks his message, while the unit records it. At the end of his message the caller "hangs up." Thereupon the unit, using the recorded dialed number of the called party, intermittently seeks access to the called party. Upon finally obtaining such access, the unit reads the recorded message to the called party. It repeats this recorded message as long as the called part does not hang up his telephone instrument. When the called party has heard the message to the end and, if he wishes to do so, has heard it repeated, he replaces his receiver on its hook. This operation returns a signal to the TMS unit that acts to erase the record and to place the unit in readiness to accept a message from another calling party.

CIRCUIT CONNECTIONS AND SWITCHING OPERATIONS

The initial call by the calling party operates through the central station and the line finder 113 to give the calling party access to an idle TMS unit. The operations are as follows:

(*a*) *Preparing apparatus to accept called party's telephone number*

Energization of the incoming line takes place in the ordinary fashion as soon as the line finder 113 has connected the caller's telephone instrument to the TMS unit. A fully conductive signalling and message path now extends from a particular one o fthe incoming lines 111 to the input terminals 112 of the TMS unit. These terminals are thus energized. This operates the "slow release" relay 1 (FIG. 2).

Closure of the front contact 1–4 and 1–5 of relay 1 energizes the coil of relay 18, thereby opening both of its contacts. This in turn releases the slow release relay 19, opens its back contact 19–1 and, by removing the energization from the winding 13 of the stepping switch $S_1$, moves the arms of stepping switch $S_1$ from their zero contacts, which are "dead," to their first active contacts. This applies voltage from the battery $B_9$ through the second wiper arm 11 of stepping switch $S_1$ across the winding of relay 9. (To avoid undue complexity of the drawings, each battery referred to is shown merely as a terminal of designated polarity. It is to be understood that the other terminal of each such battery is connected to ground.) Energization of relay 9 operates to close its front contacts 9–21 and 9–12 and to open its back contact 9–22 and 9–11. Closure of the contacts 9–21 and 9–12 connects the input terminals of the recorder 105, through the contacts 18–1 of the relay 18, still open, to the output terminals of a dial pulse oscillator 149 and so puts the recorder 105 partly in readiness to receive and accept dial pulses. The closure of contact 8–4 of relay 8, that is operated through contact 1–7 of relay 1, applies high frequency bias, derived from a bias source 151 to the recording head 135.

Closure of contacts 1–1 and 1–2 of relay 1 connects a dial tone generator 147, which may be of conventional construction and is individual to each TMS unit, to the terminals 112, and thence, through the line finder 113, to the calling party's line 111 (FIG. 1). One side of the circuit of the dial tone generator 147 runs from contact 1–1 of relay 1 through the first and second points of bank 10 of a stepping switch $S_1$ through front contact 1–6 of relay 1, to one of the terminals 112. The other side of the dial tone generator circuit runs through contacts 1–2 and 1–3 of relay 1 to the other of the terminals 112. Thus the output of the dial tone generator 147 is applied by way of the incoming line 111 to the calling party's telephone instrument. He, therefore, hears conventional "dial tone" which informs him that the TMS unit is ready to accept dial pulses.

Meantime, also, closure of contact 8–2 of relay 8 starts the tape wind motor 125 in the recorder 105. The motor and the power source which drives it may be of any kind. As a matter of convenience it may be a synchronous motor supplied from the conventional 110 volt line, here indicated as a source 153, switched by the contacts of relay 8.

(*b*) *Calling party "dials" called party's telephone number onto record*

The calling party, having been informed by the dial tone, which he hears, that the TMS unit is ready to receive the "destination code" of the message to come, i.e., the called party's telephone number, proceeds to "dial"

that number in the ordinary fashion. As he does so, the control apparatus operates as follows:

When the caller dials the first digit, thus generating the first dial pulse train, the contacts 18–1 and 18–2 of relay 18 open and close with each of the individual dial pulses. (During this pulse train, relay 1 remains energized from the incoming line 111, and is prevented from releasing between each dial pulse and the next, by its slow-release feature.) Each such closure connects the dial pulse oscillator 149 to the recorder input terminals 139 for a brief interval and thereby applies, for each pulse and by way of the recording head 135, a burst of tone from the dial pulse oscillator 149 to the tape 121. Thus, for example, if the initial digit dialed were a "7," seven brief bursts of tone are recorded in sequence, at a rate determined by the governor in the calling party's dial, and spaced apart on the recording medium as determined by this rate and the speed of advance of the recorder. The same happens for each dialed digit, so that the recorder bears blank spaces between the pulse group representing any one digit and the pulse group representing the next digit. The resulting train of dial pulse tone bursts is thus disposed along the length of the tape 121 immediately adjacent the conductive strip 131 which marks the "start" position of the tape, except for an inconsequential gap which may exist due to the caller's having paused after hearing his dial tone and commencing his dialing operation, during which pause the wind motor 125 advances the tape 121.

*(c) Apparatus counts the digits dialed*

The stepping switch $S_1$ is to be advanced by one position or contact for each digit dialed; i.e., for each single dial pulse group. This advance is secured as follows: The initial dial pulse of each group operates relay 19 through a back contact 18–2 of relay 18. Relay 19 is designed for slow release so that it holds up between successive pulses of a single group but falls back in the much longer pause between the last pulse of one group and the first pulse of the next group. Each time the relay 19 falls back it releases the holding winding 13 of the stepping switch $S_1$ and allows a spring 13*a* to urge a pawl 13*b* against one of its teeth, thus to advance it by one point (a stepping switch of this type is fully described in Tillman Patent 2,298,519).

The reason for this stepping action is to count the number of digits dialed. The system is designed, like any dial system, for some particular prescribed number of digits, e.g., seven, after the dialing of which the designation of the called party is treated as complete. The stepping switch thus counts the number of digits; and having counted to the prescribed number, changes the connections so that the calling party's voice may now obtain access to the recorder. It also operates to disconnect the dial tone generator 147 from the incoming line terminals 112. It does this after the second digit has been dialed when the arm of bank 10 of stepping switch $S_1$ reaches an inactive contact.

*(d) Switching upon completion of digit count*

Upon the completion of the digit count, e.g., the count of seven successive digits, the arm of the bank 11 of the stepping switch $S_1$ has reached its eight contact point, which is inactive. This deenergizes relay 9 and connects the input terminals of the recorder 105 by way of the back contacts 9–11 and 9–22 of the relay 9, and the front contacts 1–6 and 1–3 of the relay 1, to the incoming line terminals 112. The recorder tape 121 is still advancing because the operation of contact 1–7 of relay 1 holds the relay 8 in the actuated condition and power continues to be supplied to the wind motor 125 from the source 153 through the contacts 8–2.

*(e) Recording of Mark I tone patch*

The next operation is to mark, on the tape 121, the termination of the dial pulse record and the beginning of the voice message. This is accomplished by applying a brief burst of tone from a Mark tone generator 155 to the recording head 135 in the following fashion: The wiper arm of bank 12 of stepping switch $S_1$ has reached its eight contact point, which is connected to ground. This establishes a circuit through a battery $B_{10}$ and the winding of relay 17 which immediately closes the upper front contact 17–1 and opens the lower back contact 17–2. A closed circuit is now briefly established from the Mark tone generator 155 through the front contacts 14–1 of slow release relay 14, which has not yet released, and the front contacts 17–1 of relay 17 to the input terminals of the recorder 105 and also, to reassure the caller that all is well, to the incoming line terminals 112. The record, on the tape 121, of this tone burst is termed a Mark I patch. It will be observed that it is the effect of the foregoing operations to record the Mark I patch on the tape 121 immediately following the record of the final digit pulse, whether the digit pulses be closely spaced, as when applied by a rapid dialing operation, or whether they be spaced much further apart, as when applied by a slow or hesitant dialer.

After a brief interval, the slow release relay 14 opens. This is because its energization was lost by opening the lower back contact 17–2 of the relay 17. Opening of the contacts 14–1 of relay 14 disestablishes the path from the Mark tone generator 155 and so removes tone both from the recorder 105 and from the incoming line terminals 112.

*(f) Recording of voice message*

The TMS unit is now ready to receive the calling party's message, and he has been informed of this fact by the burst of tone from the generator 155.

He may now speak his message, and it is recorded on the tape 121.

At the conclusion of his message he replaces his telephone instrument on its hook and goes about his business. It is highly desirable, however, that the tape 121 bear a positive indication that the message record has been completed; and to this end the Mark tone generator 155 is utilized again in the following fashion:

*(g) Recording of Mark II tone patch*

When the calling party replaces his instrument on its hook, the incoming line terminals 112 are deenergized and the relay 1 is released. Closure of the back contact 1–8 of the relay 1 energizes the winding of relay 15 which closes its front contact 15–1 and opens contact 15–2. A path is now established from one terminal of the Mark tone generator 155 through the contacts 16–1 of a slow release relay 16, heretofore closed, and the front contacts 15–1 of relay 15, just closed, the input terminals of the recorder 105 and back to the other terminal of the Mark tone generator 155. Hence, tone from this generator is applied to the tape 121, thus to record this tone burst on the tape 121 as a Mark II patch. In about one-half second, depending on the design of the slow release relay 16, the contacts of this relay are opened because its winding has been deenergized by the opening of the back contact of relay 15. Thereupon the application of the tone to the recorder 105 ceases. A second or so thereafter, depending on the design of the slow release relay 8, now deenergized by the opening of the front contact 1–7 of the relay 1, power is removed from the wind motor 125 by the opening of contacts 8–2 on relay 8, whereupon the motor 125 and the tape 121 come to rest. If desired to cause the tape movement to cease more abruptly, brakes may be applied under control of additional contacts on the relay 8.

*(h) Prevention of undesired access to TMS unit and associated line finder until they have been cleared*

Provision must be made so that when a given TMS facility is busy either receiving an incoming message, delivering an outgoing message, or waiting the opportunity to deliver one, the associated incoming line finder 113 will indicate that the TMS facility is busy and by well-known means a second incoming customer's line will be routed automatically to another TMS facility that is not busy. This is accomplished in the following manner: After an incoming customer has delivered his message, the line finder that routed his message to a given TMS facility is not released when this customer hangs up, thereby continuing to indicate to a second incoming customer's line that this TMS facility is still busy and not available for receiving a new message.

*(i) Arrangement of entire record*

The recording operation is now completed and, as shown in detail in FIGS. 5A and 5B, the record consists of the following portions in order, commencing just beyond the conducting patch 131:

First, the telephone number of the called party in the form of a record of the dial pulse tone fully modulated by dial pulses of square waveform;

Second, a patch of Mark I tone of duration determined by the release time of the relay 14, indicating the completion of the record of the called party's number and the commencement of the telephone message;

Third, the recorded voice message itself in conventional sound record form;

Fourth and last, a terminal patch of Mark II tone, of duration determined by the release time of the relay 16.

THE TMS UNIT MAKES THE CALL

*(j) Tape record is rewound to starting position*

As stated in connection with the concluding portion of the description of the recording operations, the last event is the release of relay 8. Upon release of relay 8, its back contact 8–1 closes, thus establishing a circuit from ground through the back contacts 8–1 of relay 8, the condenser $C_1$, shunted by the battery $B_1$ and resistor $R_1$, and the winding of relay 34 (FIG. 3) and back to ground. This, in effect, connects the condenser $C_1$ directly across the winding of relay 34. Therefore, the condenser $C_1$ was charged to a suitable voltage through a resistor $R_1$ by the battery $B_1$.

The condenser $C_1$ now discharges through the winding of relay 34, causing a momentary closure of its front contacts 34–1. This momentary closure of the contacts 34–1 applies the voltage of a battery $B_2$ to the winding of relay 35, thus operating it and closing its front contacts 35–2 and 35–3. Closure of the lower front contacts 35–3 establishes a connection to ground through the back contact 33–2 of relay 33 and the battery $B_2$, thus holding the relay 35 in the operated condition. Closure of the upper front contacts 35–2 of relay 35 energizes relay 31 by way of a battery $B_3$ and so closes its front contacts 31–1. These contacts operate to establish a connection from the power source 153 (FIG. 2) to the high speed rewind motor 129 within the recorder 105. Rotation of this motor then drives the tape 121 back toward its starting point, identified by the juxtaposition of patch or strip 131 of conducting paint or metal suitably located on the face of the tape 121 with associated contact electrodes 133 (FIG. 3).

*(k) Rewind operation terminates, and tape comes to rest, at starting position*

When the tape 121, in the course of its reverse movement, has reached a point such that this conducting strip is juxtaposed with the probes 133, a connection is established by way of these probes and the conducting strip 131 through the winding of a relay 33 and a battery $B_4$ to ground. This energizes the relay 33, opens its back contacts 33–2, and so breaks the circuit of the winding of the relay 35, allowing it to return to its unoperated condition. This, in turn, deenergizes the relay 31, allowing it to open the circuit of the high speed reverse motor 129 by means of contacts 31–1, and so halting the movement of the tape 121. As a refinement, and in accordance with known techniques, arrangement may be made to apply brakes to the rewind motor 129, thereby to bring the tape 121 to rest substantially instantaneously.

*(l) Testing for idle condition of called party's line*

Closure of the upper back contact 35–1 of relay 35, mentioned above in connection with bringing the tape 121 to rest at its starting point, establishes a connection from the condenser $C_2$, theretofore charged by a battery $B_5$, through the resistor $R_2$ to the winding of relay 38, thereby discharging the condenser $C_2$ through the winding of relay 38 and so operating it momentarily and only during the discharge of the condenser. This momentarily closes the front contacts 38–1 of relay 38 which starts the operation of a timer motor $M_2$. This motor proceeds to rotate an output shaft to which it is coupled through a gear train. This output shaft bears a cam 41, of which the cam follower controls two sets of contacts. The output shaft makes a single revolution and then comes to rest. The motor speed and gear train are adjusted so that this single revolution of the output shaft of the motor requires a period of about thirty seconds. This period is selected to ensure that the apparatus shall continue in calling condition for a time sufficiently long to give ample opportunity to the called party to answer his telephone, when it rings. The working face of the cam is so shaped that the follower falls into a depression in it for one position of the drive shaft, thus opening both sets of contacts, and holding these contacts closed for all other positions of the drive shaft. The lower cam contacts 41–1 are connected in parallel with the contacts 38–1 of the relay 38. Hence, once the motor $M_2$ has been started, as described above, by momentary operation of the relay 38, its power supply is continued through the cam contacts 41–1 and it continues to run until it has driven the cam 41 through one full revolution; i.e., for thirty seconds, whereupon it comes to rest. The motor $M_2$ and the cam 41 thus serve, together, as a clock, for the measurement of a thirty second period, commencing with the operation of the relay 38.

Rotation of the output shaft of the motor $M_2$ also rotates the cam 42 through a single revolution which, as explained above, occupies thirty seconds. In contrast to the cam 41, the cam 42 bears a single boss at one point of its periphery such that when this boss drives the associated cam follower, it momentarily closes two pairs of contacts which are otherwise open. Closure of the cam contacts 41–2 energizes the winding of relay 21 through a battery $B_6$ and operates both of the front contacts 21–1 and 21–2. Closure of the front contacts of relay 21 connects the output terminals of the recorder 105 through moving contacts 36–1 and 36–2 and the associated back contacts of relay 36, as yet unenergized, to the input terminals of a dial pulse generator 109 and also, through moving contacts 36–3 and 36–4 and associated back contacts, connects the output terminals of the dial pulse generator 109 to the output terminals 114 of the TMS unit: That is to say, to the outgoing line finder 115, and so places the TMS unit in readiness to endeavor to dial the called party's telephone number.

*(m) The TMS unit "hears" dial tone*

Standard apparatus, not shown, which forms a part of the conventional telephone central office responds to the connection of the recorder 105 through the output terminals 114 to the outgoing line finder 115 by supplying dial tone to the TMS unit. Dial tone coming in from the outgoing line finder 115 reaches the input terminals of a dial tone recognizer 161, which may be a tuned circuit or other selectively responsive device. Such apparatus components are well known in the art and are normally included in conventional telephone answering sets for use on the premises of a subscriber.

*(n) The TMS unit "dials" the called party's telephone number*

Upon recognizing dial tone, the dial tone recognizer 161 delivers an output signal through the winding of a relay 22 which is then locked in the operated condition through its own front contacts 22–2, the back contacts 23–1 of relay 23, and a battery $B_7$. The upper front contacts 22–1 of the relay 22 are connected in parallel with the front contacts 8–2 of the relay 8, and hence operation of the relay 22 acts in the same way as does operation of the relay 8, described above, to energize the low-speed wind motor 125 of the recorder 105, thus to advance the tape 121. As the tape 121 is thus advanced each of the recorded pulses of each pulse group of the called party's telephone number (see FIG. 5) passes the reproduce head 141 in succession and so delivers an output by way of the back contacts 36–11 and 36–21 of a relay 36 to the dial pulse generator 109. The dial pulse generator 109 may comprise a full wave rectifier 163 followed by the winding of a relay 165. It thus converts the high frequency tone voltage derived by the reproduce head 141 from each square-wave-modulated dial pulse as an envelope, into the opening of the contacts of the relay 165 for, and throughout the duration of, each dial pulse, leaving them otherwise closed. It thus acts in precisely the fashion of a conventional rotary dial on a subscriber's telephone instrument to open the output terminals 114 of the TMS unit momentarily once for each pulse and so to deliver dial pulses of conventional character to the outgoing line.

These dial pulses act through conventional central station switching apparatus, of which the line finder 115 is shown in FIG. 1, to select the called party's line and to ring his telephone bell. This ringing operation continues throughout the remainder of the thirty second calling period, as determined by the clock motor $M_2$.

*(o) Mark I tone patch brings record to rest*

As remarked above in connection with the recording operation, a Mark I patch, of tone distinguishable in character from each dial pulse, has been recorded on the tape 121 at the end of the sequence of dial pulses. Once the operation of automatic dialing by the recorded dial pulses has been completed, this Mark I patch reaches the reproduce head 141. The output of the reproduce head is now a voltage of frequency determined by the frequency of the Mark tone generator 155. It is recognized by a low tone pulse recognizer 167 which is shunted across the output terminals of the reproduce head 141. The low tone pulse recognizer 167 then operates the relay 23. The low tone pulse recognizer 167 may be an apparatus component similar in its construction to the dial tone recognizer 161 but tuned or otherwise adjusted to respond selectively only to the frequency now under consideration; namely, that of the recorded Mark I patch.

Operation of the relay 23 releases the relay 22 and, by opening contacts 23–1, removes the energization from the forward wind motor 125, allowing the tape 121 to come to rest. Closure of the front contact 23–2 of the relay 23 energizes the winding 24 of stepping switch $S_2$ through battery $B_8$, thus drawing the armature, carrying the pawl **24*a*, back against the tension of its spring 24*b* and so preparing the stepping switch $S_2$ for its next advance. After the low tone has ceased, i.e., after the portion of the record bearing the Mark I patch has passed the reproduce head 141, winding 24 is deenergized through the opening of the front contact 23–2 of relay 23. The spring 24*b* then urges the pawl 24a** against its ratchet, and so advances the stepping switch $S_2$ from its first position to its second position.

*(p) Thirty second pause in which called party may answer*

If, within the allotted period of thirty seconds, determined by a full revolution of the cam 41, the called party fails to answer his telephone; or if throughout the same period his line remains busy, then the momentary closure of the contacts driven by the follower of cam 42, which occurs just prior to the conclusion of this thirty second period, carries out two operations:

*(q) Record returned to starting point for a fresh attempt*

First, through the front cam contacts 42–1 and the back contacts 30–3 of the relay 30, as yet unoperated, it starts the rotation of a motor $M_1$. The function of this motor will be described below.

Second, through the front cam contacts 42–2, the battery $B_8$ is connected to the winding 24 of the stepping switch $S_2$. This draws the pawl **24*a* of the stepping switch $S_2$ backward against the tension of its spring 24*b* and prepares the switch $S_2$ for its next operation. Immediately the boss on the cam 42 has passed its follower, the contacts 42–2 open, the winding 24 is deenergized and the spring 24*b* urges the pawl 24*a*** of the stepping switch $S_2$ forward, thus advancing this stepping switch from its second position to its third position.

At the same time, the opening of the contacts driven by the follower of cam 41 disconnects the TMS unit from the input terminals 114 of the outgoing line finder 115.

When the rotor 26 of the stepping switch $S_2$ reaches its third position, it operates relay 31 through the back contacts 28–4 and 30–6 of relays 28 and 30. The operation of relay 31 starts the rewind motor 129 and drives the tape 121 in a high speed reverse direction through the operation of its upper front contact 31–1. When the reverse motion of the tape 121 has brought the conducting strip 131 into egagement with probes 133, the relay 33 is operated by $B_4$ and contacts 33–1 close the circuit to relay 28 through battery $B_{11}$. Relay 28, thus energized, operates, and is held operated, through its upper front contact 28–3 and the lower back contact 22–3 of relay 22. The operation of relay 28 opens its back contact 28–4 and stops the high speed reverse motion of the rewind motor 129. The closing of the lower front contact 28–5 of relay 28 causes the rotors 25 and 26 of $S_2$ to start stepping forward through the front contact 24–1 of the winding 24 of $S_2$, a back contact 30–5 of relay 30, and the rotor 25. This stepping comes to an end when the rotor 25 has moved from its fourth position, whereupon the arms of both rotors are in their first positions.

*(r) Fresh attempt made after lapse of fifteen minutes*

The motor $M_1$, having been started as stated above, rotates for a preassigned period, such as fifteen minutes, and then comes to rest. This may be arranged in any convenient fashion, e.g., by shunting the motor-control contacts described above with contacts 43–1, driven by the follower of a cam 43 that is driven, in turn, by a slow-speed shaft coupled to the motor shaft through an appropriate gear train. The motor is essentially a convenient form of clock which measures time in units of convenient magnitude, such as fifteen minutes. At the end of this period, momentary closure of a contact associated with the cam 44, driven by the shaft of the motor $M_1$ and making a single revolution in this fifteen minute period, operates relay 38 momentarily. Operation of the relay 38 recommences the unit's attempts to reach the called party, whereupon all of the operations subsequent to the engagement of the probes 133 with the conducting strip 131 are repeated. It continues to make such attempts to reach the called party indefinitely or until, by a refinement in programming of any desired sort, its orders are changed.

*(s) Called party answers and TMS unit prepares to deliver message*

Eventually an occasion will arise on which, when the apparatus dials the called party in the fashion described above and his telephone rings, he answers the call by lifting his receiver from its hook. When this takes place, conventional apparatus located at the central station operates to energize the selected one of the outgoing lines 117 with a so-called "Receiver-Off-Hook" or "ROH" signal. The ROH recognizer 169 responds to this "receiver-off-hook" signal and energizes the winding of relay 30, closing its four front contacts and opening its three back contacts.

The operation of relay 30 by the ROH recognizer 169 operates relay 36 through the upper front contact 30–1 of relay 30. Through the operation of the four transfer switches of relay 36, the dial pulse generator 109 is removed from the line and the output terminals 145 of the recorder 105 are connected, through the line finder 115 to the outgoing telephone line 117. The recorder remains directly connected to the outgoing telephone line as long as the called station is in the ROH condition.

*(t) Fifteen minute clock is disabled*

Closure of the front contact 30–2 of the relay 30 energizes the winding of relay 21 through battery $B_6$ and conductor $A_1$. Operation of the contacts 21–1 and 21–2 of relay 21 holds the connection of the recorder output terminals 145 to the outgoing line 117, thus bypassing the contacts of the cam 41 which would otherwise break this connection after an interval of thirty seconds. The upper back contacts 30–3 of the relay 30 are connected in series through the conductors $A_2$, with the contacts associated with the cam 42 and hence operation of the relay 30 prevents the starting of the motor $M_1$, which would otherwise start rotating after an interval of thirty seconds as determined by a revolution of the cam 42. Thus the fifteen minute "clock" is disabled.

In many cases, of course, the delivery of the message, to be described below, will be completed in a time much less than fifteen minutes, in which case disabling of the fifteen minute clock serves no purpose. Provision is made for it to ensure against faulty operation of the system in the exceptional case in which the delivery of the call takes more than fifteen minutes. Furthermore, in the case of a brief message it is desirable that the recorder 105 be placed in readiness to receive a new record of a new incoming call immediately after the delivery of the present message has been completed. Starting of the fifteen minute clock would have postponed this readying operation until the expiration of the fifteen minute period. Hence disabling of the fifteen minute clock serves the purpose both in the case of the exceptionally long message and in the case of the more usual short one.

*(u) Forward advance of record and message delivery*

The next step required is to start the advance of the tape 121 which, as described above, was stopped at the Mark I tone patch which marks completion of the delivery of the last dial pulse sequence representing the last digit of the called party's number. This is accomplished in the following fashion. Closure of the front contact 30–4 of the relay 30 energizes the wind motor 125 from the source 153 by way of the conductors $A_6$ and $A_3$, the second contact of the bank 26 of the stepping switch $S_2$. As in the case of closure of the contacts of relay 8, this establishes a circuit from the power supply 153 to the motor 125 and it commences to rotate, driving the tape 121. The next space pattern on the tape 121 to pass the reproduce head 141 is the voice message itself, placed thereon by the calling party. The reproduce head 141 translates this space pattern into an audible voice message which is a substantial replica of the message earlier spoken by the calling party.

As stated above, the called party has already lifted his telephone instrument from its hook and is presumably awaiting the message of a caller. The recorded message is therefore repeated to him by the apparatus.

*(v) Repetition of message, included between Mark I tone patch and Mark II tone patch*

If some portion or portions of the message thus relayed to the called party are not clearly heard by him or not understood, so that he wishes to hear them repeated he has only to wait, for the apparatus will repeat the message to him as often as he wishes, determined solely by his holding his receiver off its hook. The apparatus furnishes such successive repetitions in the following fashion:

As stated above, the tape 121 bears its Mark II tone patch at the conclusion of the second space pattern. Hence, as the tape 121 advances to and past the last words of the voice message this Mark record comes into registry with the reproduce head 141 which then delivers at the output terminals 145 of the recorder 105 a pulse of tone, of a low frequency determined by the slow advance speed of the tape 121. This is recognized by the low tone pulse recognizer 167 in the fashion described above, and the winding of relay 23 is energized. Operation of the front contact 23–2 of relay 23 acts through the conductor $A_4$ and the battery $B_8$ to energize the winding 24 of the stepping switch $S_2$. At the end of the tone burst, relay 23 releases and the opening of its front contact 23–2 deenergizes the winding 24 and advances the switch $S_2$ to its third position. Advance of the rotor 26 of the stepping switch $S_2$ to its third position breaks the connection by way of the conductor $A_3$ and stops the rotation of the wind motor 125. At the same time the conductor $A_5$ is connected to ground instead of the conductor $A_3$, thus applying the voltage of the battery $B_3$ to the winding of relay 31. Closure of the upper front contact 31–1 of the relay 31 establishes a path from the power source 153 to the high speed reverse motor 129 which drives the tape 121 back toward its starting point. Delivery of a high speed message in reverse to the called party is prevented by actuation of the lower contacts 31–2 of the relay 31 of which the front contact 31–21 terminates the outgoing line with a resistor 173, while the back contact 31–22 disconnects the recorder output terminals 145 from the output terminals 114.

When the high speed rewind motor 129 commences its rotation, driving the tape 121 in the reverse direction, the first signal picked up by the reproduce head 141 is that due to the Mark II tone patch. The pickup head delivers a brief signal, which is recognized by the high tone pulse recognizer 171, to energize the winding of relay 29. Closure of its contacts 29–1 energizes the coil of the stepping switch $S_2$ by way of the conductor $A_4$ and the battery $B_8$. After the Mark II tone patch has passed the reproduce head 141 and the relay 29 is deenergized, its contacts are released, the coil 24 is deenergized and the stepping switch $S_2$ is advanced from its third position to its fourth position. In the case of each of the stages 25 and 26 of the stepping switch $S_2$, the third position contact is connected directly to the fourth. Hence the circuit connections are not altered by this advance and it is included in the system merely to prevent the Mark II tone patch from initiating an undesirable operation.

As the tape 121 continues its high speed reverse movement the voice message passes rapidly past the reproduce head 141 but delivery of nonsensical sounds to the called party is prevented by the disconnection of the recorder output terminals 145 from the outgoing line 114 as described above.

When the high speed reverse movement of the tape 121 has reached and passed the initial portion of the voice message the initial Mark I patch comes into registry with the reproduce head 141 which then delivers a spurt of high frequency tone. This is recognized by the high tone pulse recognizer 171 whose output energizes the winding of the relay 29.

Closure of the contacts of the relay 29 acts as before through the conductor $A_4$ and the battery $B_3$ to energize the winding 24 of the stepping switch $S_2$, thus to advance the rotors 25 and 26 of the stepping switch $S_2$ from their fourth positions to their first positions when relay 29 releases. When the rotor 26 of the stepping switch $S_2$ moves from its fourth position to its first, the conductor $A_5$ is disabled and the conductor $A_3$ is enabled. As described above, this operates to deenergize the rewind motor 129 and to energize the wind motor 125. Accordingly, the tape 121 proceeds to advance in the normal direction and at the normal speed, delivering its message, now for the second time, to the called party. At the same time release of the relay 31 reconnects the output terminals 145 of the recorder 105 to the output terminals 114 and removes the resistance 173 from the circuit so that the message delivered by the recorder 105 can reach the called party.

*(w) Erasure of record; clearing of switches; conclusion of operations*

As indicated above, the message is repeated as often as the called party wishes to hear it. When he has satisfied himself that he has correctly heard the entire message and fully understood it, it has completely served its purpose. He may be expected then to replace his receiver on its hook. Through central station apparatus, not shown, this removes the energizing signal from the ROH recognizer 169 and allows the relay 30 to be released. Release of the upper front contact 30–2 of the relay 30 releases the relay 21 and so disconnects the output terminals 145 of the recorder 105 from the outgoing line 114. Meantime, the tape 121 continues its advance through any remaining portion of the voice message record which the called party has chosen not to hear and until the terminal Mark II patch comes into registry with the reproduce head 141. This registration deenergizes the wind motor 125 and energizes the rewind motor 129 to drive the tape 121 back toward its starting point. As before, the operation of the stepping switch $S_2$ prevents the second reverse passage of the terminal Mark II patch from causing undesired operations.

Because the recorded voice message has been delivered, and accordingly the entire record has served its purpose, it is desirable at this point of the operations to erase it in order to place the apparatus in readiness to receive and record a new set of space pattern records representing a new message intended for another called party. This is accomplished in the following fashion:

After the release of relay 30 contact 30–7 opens, and relay 37 is then kept in its operated condition through its own contact 37–1 and contact 28–2 of relay 28. When contacts 133 make contact with the conducting strip 131 relay 33 is operated through battery $B_4$. Operation of relay 33 in turn operates relay 28 through $B_{11}$ thereby releasing contact 28–2. Relay 37 remains operated for a period of about one-half second because of its slow release feature. During this interval alternating current flows from an erase generator 175 through contacts 28–1 of relay 28 and 37–2 of relay 37 to the bulk erase coil 177. The resulting magnetic field passes in well known fashion through the entire bulk of the coil of tape 121, now wound on the rewind reel 123, and so erases the entire record, including the dial pulse record of the called party's number, the message which follows, and the initial and terminal Mark patches. The tape 121 is now in readiness to receive a fresh record, originating with the next caller who may desire to avail himself of the TMS service. At the same time the stepping switch $S_1$, is reset to its starting position by application of a ground connection to the release winding 179 through contact 37–3 on relay 37, contact 28–6 on relay 28 and battery $B_{20}$. In the same way it can operate the release winding of the associated incoming line finder 113, through a control circuit 157 shown in FIG. 1, restore it to its original normal state and put it in readiness to route an incoming customer's line 111 to the now ready TMS unit.

It will be noted that the apparatus ensures the erasure of the record and the restoration of the associated switching apparatus to its initial condition of readiness can take place only under the proper conditions and under no others: for example, there is no possibility of erasure of the record upon the first return of the tape 121 to its starting position after the first unsuccesful attempt to reach the called party, nor is there any possibility of such erasure after the return of the message-bearing portion of the tape 121 to its starting position before the commencement of the second reading of the message. This ensurance is provided by the series connection of the relay contacts 37–2 and 28–1, so that two conditions must hold before the erasure and switching circuit restoration take place: first, the tape 121 must have been returned by the rewind motor 129 to its starting position as determined by the juxtaposition of the contacts 133 with the conducting strip 131; and second, the called party's telephone instrument must be on its hook. The first of these conditions control relay 28 while the second controls relay 37 through relay 30.

What is claimed is:

1. In a telephone system, automatic central station message storage apparatus which comprises a storage unit including a sensitive, linearly extended medium capable of bearing a record of signal pulses and of a message wave, said record having an undulating spatial distribution, means responsive to a preassigned call number signaled by a call-originating party and appearing on an incoming line of said apparatus for providing said party with access through said line to said unit, means individually responsive to each one of a sequence of signal pulses signaled by said call-originating party, appearing on said incoming line and constituting a code designation of a selected outgoing telephone line extending to a called party's telephone instrument, for establishing on said medium a first space pattern record of said code designation, and means responsive to the completion of said first space pattern record for establishing a voice connection between said call-originating party and said unit, thereupon permitting the recording of a message that said call-originating party may speak on said medium as a second space pattern record.

2. In combination with apparatus as defined in claim 1, means responsive to the termination of said signal pulse sequence for establishing on said medium a Mark record following said first space pattern and preceding said second space pattern.

3. In combination with apparatus as defined in claim 1, means responsive to the termination of said signal pulse sequence for establishing on said medium a first Mark record following said first space pattern and means operative upon termination of said access for establishing on said medium a second Mark record following said second space pattern.

4. In combination with apparatus as defined in claim 2 a first oscillation generator and a second oscillation generator, means for utilizing said first oscillation generator to establish said first space pattern record and means for utilizing said second oscillation generator for establishing said Mark record.

5. In combination with apparatus as defined in claim 1 means for counting the successive groups of signal pulses constituting said code designation and means, operative when the count has reached a preassigned number, for establishing on said medium a Mark record following said first space pattern and preceding said second space pattern 6. In a telephone system, automatic central station message delivery apparatus which comprises, in combination with a storage unit including a sensitive, linearly extended medium sequentially bearing a first space pattern record of the code designation of a telephone line extend ing to a called party's substation and a second space pattern record of a voice message wave destined for said called party, means controlled solely by said first space pattern record for seeking access to said called party's line and for signaling said called party, and means responsive solely to the called party's acknowledgment of a signal, by lifting his handset from its hook, for establishing a telephone connection between his telephone instrument and said unit and for reading out said second space pattern as a message into said called party's line.

7. In combination with apparatus as defined in claim 6, means, operative upon the lapse of a preassigned time interval after an unsuccessful attempt to obtain said access, for repeating said attempt.

8. In combination with apparatus as defined in claim 6, means, operative upon the lapse of a preassigned time interval after an unsuccessful attempt to obtain said access, for repeating said attempt, and means for disestablishing all outgoing connections between said unit and other components of said central station apparatus throughout the major portion of the interval between successive ones of said attempts.

9. In combination with apparatus as defined in claim 6, means, operative upon the conclusion of said readout operation and without benefit of any additional signal, for repeating said read-out operation.

10. In combination with apparatus as defined in claim 6, means responsive to disestablishment of said telephone connection by the called party for erasing said space patterns and for readying said unit to receive and accept a similar pair of space patterns of which the members are representative, respectively, of the code designation of a telephone line extending to another called party's substation and of a voice message destined for said other called party.

11. Apparatus as defined in claim 6 wherein said record-bearing medium is a sensitive tape and wherein said read-out means comprises a reproduce head juxtaposed with said tape and a mechanism for advancing said tape at a preassigned slow speed past said reproduce head.

12. In combination with apparatus as defined in claim 11, means, operative at the conclusion of said read-out operation, for returning said tape to an initial position in which the earliest portion of the second space pattern record is juxtaposed with said reproduce head, and means for effecting said return at a speed substantially in excess of said advance speed.

13. In combination with apparatus as defined in claim 12, means, operative during each said tape return operation, for disconnecting the called party's telephone line from said unit and for connecting said line, instead, to a fixed impedance element.

14. In a telephone system, automatic central station message storage and delivery apparatus which comprises a storage unit including a sensitive, linearly extended medium capable of bearing a record of signal pulses and of a message wave, said record having an undulating spatial distribution, means responsive to a preassigned call number signaled by a call-originating party and appearing on an incoming line of said apparatus for providing said party with access through said line to said unit, control means individually responsive to each one of a sequence of signal pulses, which pulses are applied to said incoming line by said call-originating party and are constituents of a code designation of a selected telephone line extending to a called party's telephone instrument, said control means establishing on said medium a first space pattern record of said code designation, means for thereupon recording a message that the calling party may speak on said medium as a second space pattern record, means controlled solely by said first space pattern record for seeking access to the called party's line and for signaling said called party, and means responsive solely to the called party's acknowledgment of a signal, by lifting his handset from its hook, for establishing a telephone connection between said called party's telephone instrument and said unit and for reading out said second space pattern as a message into said called party's line.

15. In combination with apparatus as defined in claim 14, means responsive to the termination of said signal pulse sequence for establishing on said medium a first Mark record following said first space pattern and means, responsive to termination of the access of the calling party to the unit, for establishing on said medium a second Mark record following said space pattern.

16. Apparatus as defined in claim 15 wherein said record-bearing medium is a sensitive tape and wherein said read-out means comprises a reproduce head juxtaposed with said tape and a mechanism for advancing said tape at a preassigned slow speed past said reproduce head.

17. In combination with apparatus as defined in claim 16, means responsive to advance of a mark-bearing portion of said tape past said reproduce head in one direction for initiating switching operations of one kind and means responsive to return of a mark-bearing portion of said tape past said reproduce head in the other direction for initiating switching operations of a second kind.

18. In a telephone system, automatic central station message storage apparatus which comprises a storage unit including a sensitive, linearly extended medium capable of bearing a record of signal pulses, of tone pulses and of a message wave, said record having an undulating spatial distribution, means for establishing a connection from said calling party to said apparatus in response to a preassigned code signal identified with said apparatus and dialed in a first instance by said calling party, means activated by said connection for generating a dial tone notifying said calling party of the ready condition of said unit, oscillator means activated by said connection for responding to pulses dialed in a second instance by said calling party following completion of said connection, which pulses constitute the code designation of a called party, and causing said code designation to be stored on said sensitive medium, means controlled by the first pulse of said code designation for disconnecting said dial tone generating means, means controlled by the last pulse of said code designation for disconnecting said oscillator means and for establishing a voice connection from said incoming line to said unit, means controlled by the last pulse of said code designation for activating a tone generator notifying said calling party by a burst of tone of the completed storage of said code designation, means for simultaneously storing said burst on said sensitive medium, whereupon said calling party is enabled to record upon said sensitive medium the voice message intended for said called party, and means responsive to the termination of said voice message for reconnecting said tone generator and recording a tone burst on said sensitive medium signifying the termination of said message, whereby said medium has stored upon it, in linear sequence, undulating spatial patterns designating the telephone code assigned to said called party, a tone signal, and the stored message intended for said called party.

19. In a telephone system, automatic central station message delivery apparatus which comprises, a storage unit including a sensitive, linearly extended medium sequentially bearing a first undulating space pattern record of the code designation of a called party, a second undulating space pattern record of a tone burst and a third undulating space pattern record of a voice message of a calling party, means responsive to the termination of transmitted information dispatched by said calling party for causing the initial output of said unit to be the first component of said code designation, timer means controlled by said ready condition for connecting said unit to a line finder of said system, said timer means ceasing to function after a prescribed interval and disconnecting said unit if necessary contact is not established with said called party, means for recognizing an incoming dial tone on the outgoing line of said apparatus indicating the establishment of a positive connection between said line finder and said unit, means responsive to the recognition of said dial tone for energizing a switch to commence the readout of the space patterns stored on said sensitive medium, means responsive to the readout of said first space pattern for generating the pulses of said code designation and causing the transmission thereof along said outgoing line seeking to establish connection between said apparatus and said called party for whom said voice message is intended, means responsive to the readout of said second space pattern for de-energizing said switch, means controlled by the off-hook condition of the telephone receiver of said called party for disconnecting the generator of said pulses from said outgoing line, means controlled by said off-hook condition for substituting therefor a voice connection to said sensitive medium, means controlled by said off-hook condition re-energizing said switch and causing direct reception of said voiced message by said called party, and means responsive to the busy condition and the unanswered condition of said receiver for seeking to establish connection with said receiver after the passage of a prescribed time interval.

References Cited in the file of this patent

UNITED STATES PATENTS

| | | |
|---|---|---|
| 2,244,004 | Erwin | June 3, 1941 |
| 2,385,968 | Deakin | Oct. 2, 1945 |
| 2,527,145 | Mitchell | Oct. 24, 1950 |